(12) United States Patent
Aschauer et al.

(10) Patent No.: US 11,003,763 B2
(45) Date of Patent: *May 11, 2021

(54) METHODS AND APPARATUSES FOR ACHIEVING A SECURITY FUNCTION, IN PARTICULAR IN THE ENVIRONMENT OF A DEVICE AND/OR INSTALLATION CONTROLLER

(71) Applicant: SIEMENS AKTIENGESELLSCHAFT, Munich (DE)

(72) Inventors: Hans Aschauer, Munich (DE); Rainer Falk, Poing (DE); Kai Fischer, Baldham (DE); Steffen Fries, Baldham (DE); Markus Heintel, Munich (DE); Wolfgang Klasen, Ottobrunn (DE); Axel Pfau, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 143 days.

This patent is subject to a terminal disclaimer.

(21) Appl. No.: 16/050,435

(22) Filed: Jul. 31, 2018

(65) Prior Publication Data

US 2019/0042731 A1 Feb. 7, 2019

(30) Foreign Application Priority Data

Aug. 2, 2017 (EP) ..................................... 17184450

(51) Int. Cl.
*G06F 21/00* (2013.01)
*G06F 21/52* (2013.01)
(Continued)

(52) U.S. Cl.
CPC ................ *G06F 21/52* (2013.01); *G06F 8/61* (2013.01); *H04L 9/085* (2013.01); *H04L 9/0866* (2013.01);
(Continued)

(58) Field of Classification Search
CPC ......... H04L 9/08; H04L 9/0816; H04L 9/085; H04L 9/0861; H04L 9/0877;
(Continued)

(56) References Cited

U.S. PATENT DOCUMENTS 8,989,386 B2 3/2015 Falk
2011/0072279 A1* 3/2011 Milliken ................. G06F 21/71
713/194

(Continued)

FOREIGN PATENT DOCUMENTS

CN 101663856 A 3/2010
CN 101964039 A 2/2011
(Continued)

OTHER PUBLICATIONS

Wikipedia: "Secure multi-party computation", https://en.wikipedia.org/wiki/Secure_multi-party_computation; 2017.
(Continued)

*Primary Examiner* — Edward Zee
(74) *Attorney, Agent, or Firm* — Schmeiser, Olsen & Watts LLP

(57) ABSTRACT

Provided is a method for achieving a security function for a security control device for controlling a device or an installation, including: a basic control device, and a security module and having the following steps of a) providing at least one first partial secret which is stored in the basic control device, b) providing at least one second partial secret which is stored in the security module, c) combining the at least one first partial secret and the at least one second partial
(Continued)

secret in order to achieve the security function, wherein the at least one first partial secret is broken down into sections of a predefinable size and the set of sections is gradually combined with the at least second partial secret by means of a calculation rule, which can be processed within a predefinable period during the execution of the calculation rule according to the size and set.

18 Claims, 1 Drawing Sheet

(51) Int. Cl.
  *G06F 8/61* (2018.01)
  *H04L 9/08* (2006.01)
(52) U.S. Cl.
  CPC ...... *H04L 9/0877* (2013.01); *G06F 2221/033* (2013.01); *H04L 2209/127* (2013.01)
(58) Field of Classification Search
  CPC ....... H04L 9/3278; G06F 21/30; G06F 21/31; G06F 21/34; G06F 21/604
  See application file for complete search history.

(56) References Cited

U.S. PATENT DOCUMENTS

| | | | |
|---|---|---|---|
| 2012/0072736 A1 | 3/2012 | Kudoh et al. | |
| 2012/0198242 A1* | 8/2012 | Dalzell | G06F 21/55 713/190 |
| 2013/0010965 A1 | 1/2013 | Falk | |
| 2015/0188718 A1* | 7/2015 | Falk | G09C 1/00 380/278 |
| 2017/0352297 A1 | 12/2017 | Aschauer et al. | |

FOREIGN PATENT DOCUMENTS

| | | |
|---|---|---|
| CN | 102598014 A | 7/2012 |
| CN | 102656839 A | 9/2012 |
| CN | 104753667 A | 7/2015 |
| CN | 105868657 A | 8/2016 |
| CN | 106788989 A | 5/2017 |
| DE | 102010011657 A1 | 9/2011 |
| EP | 3252550 A1 | 12/2017 |
| EP | 3252990 A1 | 12/2017 |

OTHER PUBLICATIONS

Krawczyk Hugo: "Cryptographic Extraction and Key Derivation: The HKDF Scheme"; Lecture Notes in Computer Science, Springer Berlin Heidelberg, Berlin, Heidelberg, XP055203776, ISSN: 0302-9743, ISBN: 978-3-54-045234-8, vol. 6223, pp. DOI: 10.1007/978-3-642-14623-7 34, p. 9, line 15, p. 14, line 6; 2010.
Yingli Zeng et al: "A key escrow scheme to IOT based on Shamir", 2013 International Conference on Communications, Circuits and Systems (ICCCAS). IEEE, vol. 2, pp. 94-97, XP032578377, DOI: 10.1109/ICCCAS.2013.6765293; 2013.
Search Report received from European Patent Office in related case 17184450.9-1218; dated Jan. 24, 2018; 8 pages.
Non-English Chinese Office Action dated Dec. 23, 2020 for Application No. 201810869957.8.

* cited by examiner

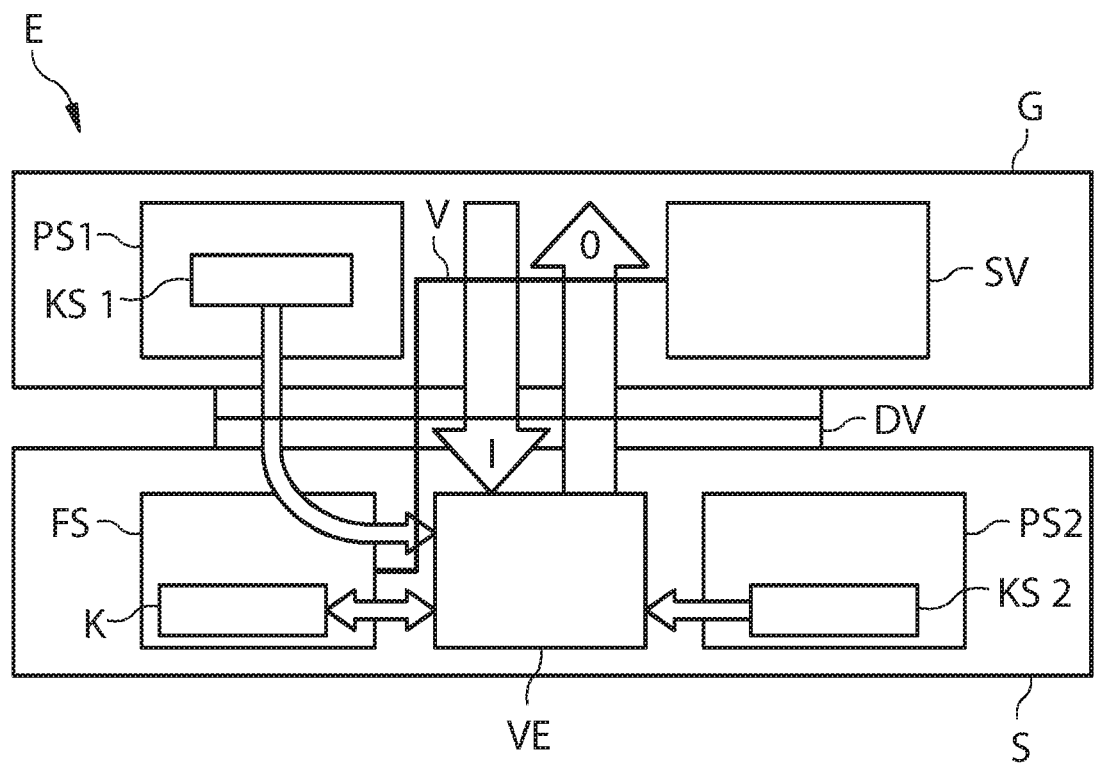

METHODS AND APPARATUSES FOR ACHIEVING A SECURITY FUNCTION, IN PARTICULAR IN THE ENVIRONMENT OF A DEVICE AND/OR INSTALLATION CONTROLLER

CROSS-REFERENCE TO RELATED APPLICATIONS

This application claims priority to European application No. EP17184450.9 having a filing date of Aug. 2, 2017 the entire contents both of which are hereby incorporated by reference.

FIELD OF TECHNOLOGY

The following relates to (operating) methods and apparatuses for a security control device for controlling a device or an installation, wherein the security control device comprises a basic control device and a security module, wherein the security module can be connected or is connected to the basic control device.

BACKGROUND

There is a need to protect products, for example devices, device components or software components, from manipulation and/or reverse engineering using IT security mechanisms. Cryptographic IT security mechanisms are already being used, for example, in smart devices, for example in devices of the Internet of Things, by cyberphysical systems, by energy technology automation systems or by manufacturing systems, industrial engineering and other installations.

Within the scope of the present description, the term "security" relates substantially to the security, confidentiality and/or integrity of data and of the transmission of the latter and also the security, confidentiality and/or integrity when accessing corresponding data. Authentication during data transmission operations or during data access also belongs to the term "security", as used within the scope of the present description. In this case, a module may be in the form of a hardware unit and/or a functional unit which may be configured using software and/or firmware. The function can be executed, for example, by means of a processor and/or a storage unit for storing program instructions.

The use of such security control devices and methods is possible. For example, a security module has already been proposed in the European patent application EP 16172472.9. In this case, the security control device comprises a basic control device and a security module, wherein the security module is connected to the basic control device by means of a data connection via a data interface.

Group authentication of devices or else components of the latter has already been proposed in the European application EP 16172887.8. The device can be authenticated only when all original components are available in the device.

Secure multi-party computation (MPC) is generally known In multi-party communication or messaging, it usually comes down to the parties being able to have private data (to be kept secret) calculated using a public function, possibly by means of a trust center, and obtaining a result without having to disclose their private data. In this case, the "trust center" checks whether the parties and their devices involved in communication are trustworthy. In this case, the various input values for the calculation are secret and are each known only to one party (or to a subset thereof). No additional trustworthy party is intended to be required for the calculation. Cryptographic operations in connection with MPC are generally computationally intensive.

An HSM (hardware security module) denotes an internal or external peripheral device for efficiently and securely executing cryptographic operations or applications. This makes it possible, for example, to ensure the trustworthiness and the integrity of data and the associated information in security-critical IT systems. In the virtual HSM, the cryptographic key of a virtual HSM is distributed among a plurality of server machines. In this case, the plurality of server machines together calculate a cryptographic operation using MPC without the HSM key being available.

With regard to the above-mentioned IT security mechanisms, less complicated security methods and devices are needed, in particular in the industrial environment.

SUMMARY

An aspect relates to methods and apparatuses or devices with improved security properties, in particular in an industrial environment.

The following claims a method for achieving a security function for a security control device for controlling a device or an installation, comprising:
a basic control device, wherein the basic control device is designed and set up in such a manner that a device which can be connected or is connected to the basic control device or an installation which can be connected or is connected to the basic control device can be controlled or is controlled by means of the execution of a control program in the basic control device, and
a security module which is designed and set up to provide or execute a cryptographic functionality for the basic control device,
   wherein the security module can be connected or is connected to the basic control device by means of a data connection,
having the following steps of:
a) providing at least one first partial secret which is stored in the basic control device,
b) providing at least one second partial secret which is stored in the security module,
c) combining the at least one first partial secret and the at least one second partial secret in order to achieve the security function,
characterized in that
the at least one first partial secret is broken down into sections of a predefinable size and the set of sections is gradually combined with the at least second partial secret by means of a calculation rule, which can be processed within a predefinable period during the execution of the calculation rule according to the size and set.

Only those sections which can be processed in the individual step are included in each individual step of the calculation rule.

In this case, the security module should be classified as "trustworthy" with respect to the basic control device and vice versa, in particular in an industrial environment (installation, manufacturing system or the like). The complicated security mechanisms mentioned at the outset can therefore be avoided.

In other words, the security function, for example the MAC (Message Authentication Code), is calculated by means of the sections processed in the individual steps. The practice of combining the sections and the partial secrets does not explicitly result in an overall secret which can be the object of an attack.

In connection with embodiments of the invention, "providing" can be understood as meaning, for example, creating, loading or storing the partial secret on or from a data storage medium or platform.

In connection with embodiments of the invention, a "calculation rule" can be understood as meaning, for example, an operation of dividing the secret into (a plurality of) partial secrets, in which case the partial secrets can in turn be subdivided into sections. A calculation rule can state, in particular, how the secret is distributed among the items of partial information. It is possible, for example, for the secret to be broken down into parts of different sizes, for example on the basis of a predefined rule. The calculation rule can also stipulate, for example, that only some of the partial secrets are needed, in particular, to calculate the secret from the partial secrets. In other words, the secret can therefore be calculated, in particular, on the basis of an incomplete secret. A portion of the secret can also be redundantly divided into at least two partial secrets, for example, by means of a calculation rule. In the case of a redundant division of a secret in particular, the corresponding items of partial information completely or partially comprise the same portion of the secret.

The operation of combining the partial secrets can be carried out within a period in which the basic control device interacts with the security module. The interaction can be enabled by the data connection which may be mechanical or else wireless.

An intermediate result when combining the sections can be temporarily provided in a buffer of the security module for the purpose of processing the content held there, wherein the intermediate result is disguised after a predefinable course of time and/or at predefinable regular intervals of time. The content of the buffer can be retained by means of a power supply from the basic control device.

Disconnection of the power supply and/or eavesdropping and/or manipulation can be detected, captured and/or logged in the interaction of the basic control device with the security module. A follow-up measure can be initiated if necessary.

It is possible to use corresponding means, for example in the form of sensors, which are suitable for detecting disconnection and/or eavesdropping and/or manipulation in the interaction between the basic control device and the security module. Corresponding follow-up measures can be initiated on the basis of the detection. In this case, such a follow-up measure which relates to a security function of the security control device may be, for example, a corresponding alarm signal, a corresponding alarm message, deletion of keys, blocking of functionalities or further comparable and/or supplementary actions.

In order to increase the security level, additional data can be included in the calculation rule for the security function.

The first partial secret can be represented in this case by a value, for example a key, generated from a so-called PUF (physical unclonable function).

In this case, the first partial secret may be a public key and the second partial secret may be a private key. Both the first partial secret and the second partial secret may consist of a public portion and a private portion which may also be private or public keys.

Another aspect of embodiments of the invention is a security control device for controlling a device or an installation, comprising:

a basic control device, wherein the basic control device is designed and set up in such a manner that a device which can be connected or is connected to the basic control device or an installation which can be connected or is connected to the basic control device can be controlled by means of the execution of a control program in the basic control device, and a security module which is designed and set up to provide or execute a cryptographic functionality for the basic control device, wherein the security module can be connected or is connected to the basic control device by means of a data connection via a data interface, having:
a) means for providing at least one first partial secret which is stored in the basic control device,
b) means for providing at least one second partial secret which is stored in the security module,
c) means for combining the at least one first partial secret and the at least one second partial secret in order to achieve the security function, wherein the combining means are designed in such a manner that the at least one first partial secret can be broken down into sections of a predefinable size or length and the set of sections can be gradually combined with the at least second partial secret by means of a calculation rule, which can be processed within a predefinable period during the execution of the calculation rule according to the size and set.

In connection with embodiments of the invention, a memory or a storage unit can be understood as meaning, for example, a memory in the form of main memory (random access memory, RAM) or a hard disk. A main memory or a so-called cache (buffer memory) can be considered to be a buffer or else a volatile memory. The hard disk can be considered to be a permanent or persistent memory. The content of a volatile memory can usually be retained only with a corresponding power supply or battery buffer or capacitor buffering.

A power supply unit may be integrated in the basic control device and ensures that the content of a (buffer) memory is retained by means of a power supply and initiates the disguising of the content of the memory by interrupting the power supply. The interruption in the connection between the basic control device and the security module is also associated with the interruption in the power supply, as a result of which the security function can no longer be completely ensured. The manipulation mentioned above can also be caused by bridging the interrupted power supply.

The security control device can be designed and set up, for example, as an automation system, a "controller", a programmable logic controller (a so-called "PLC"), an industrial PC (a so-called "IPC"), a computer, possibly including a real-time system, a modular programmable logic controller or a similar control device.

The installation or the device which can be controlled by means of the security control device can be designed and set up, for example, as a production installation, a machine tool, a robot, an autonomous transport system and/or a similar device, apparatus or installation. For example, the device or the installation can be designed or provided for the manufacturing industry, the process industry, building automation and/or the generation and distribution of energy, for a traffic safety system and/or a traffic controller.

The basic control device can correspond, for example, to a control device or to a controller without or with a partial security functionality or a complete security function. Such a control device can be designed and set up, for example, as a central unit of a programmable logic controller, as a programmable logic controller, as an industrial PC, as a PC or a similar device.

In this case, the basic control device may comprise, for example, a real-time operating system which enables real-time control of a device which is connected or can be connected to the basic device or of an installation which is connected or can be connected to the basic device.

In this case, the first partial secret may be a public key and the second partial secret may be a private key. Both the first partial secret and the second partial secret may consist of a public portion and a private portion which may also be private or public keys.

In connection with embodiments of the invention, an "(overall) secret", in particular also as a "secret in the form of a character string", may be understood as meaning, for example, an item of license information, a cryptographic key, in particular a symmetrical key or a private key of an asymmetrical key pair. In connection with embodiments of the invention, a "secret" can also be understood as meaning, for example, a password for accessing an item of license information or a cryptographic key. The secret can be generated, for example, on the basis of a further security guideline which states, for example, a key length or a calculation algorithm for the key. In particular, the expression "reconstructed secret" can be used synonymously in connection with embodiments of the invention.

In connection with embodiments of the invention, a "partial secret" can be understood as meaning, for example, a portion of the secret which is preferably stored by one of the components of a device or of an installation. A secret in the form of a character string can be divided into a plurality of partial character strings, for example, wherein a partial secret comprises at least some of the partial character strings, in particular, and can therefore be subdivided into sections.

In connection with embodiments of the invention, "security-protected" can be understood as meaning, for example, the fact that it is possible to have only read access to a security-protected component or storage unit, in particular, or that only a particular component or particular components can have access, in particular. For this purpose, the corresponding security-protected components may have protective modules or seals, for example.

A data interface may be formed between the security module and the basic control device and may be a wired or wireless interface, for example. In this case, a first coupling interface and a matching second coupling interface can be effected, for example, using a combination of accordingly complementary plug connector components or else using corresponding contact surfaces or pins. In this case, the interface can be designed and set up as a serial or parallel interface. Furthermore, the interface between the security module and the basic control device can also be designed and set up as a wireless interface, for example a WLAN, Bluetooth or NFC (near field communication) interface. In the case of a wireless interface, the power supply can be implemented in a similar manner to that during wireless charging of mobile radio devices.

Furthermore, the security module can additionally also be mechanically connected to the basic control device, in particular can be releasably connected to the basic control device. Such connections can be effected, for example, using corresponding latching means, clamping means, screwing means or any desired combinations thereof.

It is also possible to provide for the energy to be supplied to the security module via the basic control device, for example via coupling interfaces or energy supply interfaces integrated therein. The security module can also comprise its own energy source, for example a battery, a rechargeable battery, a capacitor and/or a comparable energy source. The energy source of the security module is used to buffer the buffer in order to be able to disguise its contents if the above-mentioned connection between the basic control device and the security module is disconnected.

The security function of the security control device may comprise, for example, any function for encryption, for protecting confidentiality, for protecting integrity, for authenticating data and/or the like. In this case, data may be, for example, user data, control data, configuration data and/or administrative data.

In this case, the respective security function of the security control device is achieved by means of interaction between the basic control device and the security module.

In this case, a released security module is understood as meaning a module which at least no longer has a connection to the basic control device. Accordingly, there is no longer any power supply for the security module from the basic control device. Therefore, a secret is then also not stored in the buffer.

In this case, the connection between the basic control device and the security module can be disconnected, for example, by spatially separating the interface connecting elements of the basic control device and the security module. The connection between the basic control device and the security module can be established, for example, by an interface connecting element of the security module and the interface connecting element of the basic control device approaching or making contact. In this case, the establishment of the connection can furthermore also comprise subsequent communication for establishing a functioning data connection.

Coupling interface connecting elements of the basic control device and the respective security module may comprise or consist of accordingly interacting plug elements, contact elements or else antennas, for example. Furthermore, the security module can be designed and set up in a manner corresponding to a security module according to the present description.

Embodiments of the invention also includes also include a computer program product (non-transitory computer readable storage medium having instructions, which when executed by a processor, perform actions) having program code means for carrying out the method as claimed in one of the preceding method claims when it runs on a security control device as claimed in one of the preceding device claims or is stored on a computer-readable medium.

In addition, one variant of the computer program product having program instructions for configuring a creation device may be, for example, a 3-D printer, a computer system or a production machine suitable for creating processors and/or devices.

The methods, apparatuses and computer program (products) can be designed according to the developments/embodiments of the above-mentioned security control device, security module and basic control device and their developments/embodiments.

BRIEF DESCRIPTION

Some of the embodiments will be described in detail, with references to the following Figures, wherein like designations denote like members, wherein:

FIG. 1 shows an example of a security control device having a basic control device and a security module for controlling an installation.

DETAILED DESCRIPTION

FIG. 1 shows a security control device E for controlling an installation which is not illustrated in the FIGURE. Input data I and output data O can be interchanged between a basic control device G and at least one security module S via a data connection DV by means of a data or I/O interface. The security module may be a security token. The connection or interaction between said device G and said module S can be established via a first coupling interface, for example a plug element, and a second coupling interface matching the first coupling interface, for example a corresponding mating plug element (which are both not explicitly illustrated in the FIGURE). The basic control device also comprises a control unit configured, for example, as a power supply unit SV which can be connected or is connected to a volatile buffer FS of the security module S via a supply connection V which can be integrated in the data connection DV. The coupling interfaces are then also in the form of data interfaces. The security module also has a processing unit VE with a processor, wherein a partial secret, for example in the form of a key KS2 or a derivation thereof, is stored in a persistent memory PS2 of the security module. A partial secret KS1 is likewise stored in the persistent memory PS1 of the basic control device G. If there is an existing power supply by SV, the partial secret KS1 is transmitted to the processing unit VE via the data connection DV. The processing unit VE fetches the partial secret KS2 from the memory PS2. In order to calculate the cryptographic function, for example encryption, the required secret (secret key, private key) is divided into a plurality of partial secrets KS1, KS2. In this case, each partial secret should per se meet the respective security requirements imposed on the required cryptographic strength (for example 128-bit symmetrical security).

The partial secret KS1 can be sequentially transferred in a form subdivided into sections and can be combined with the partial secret KS2 and possibly with further input data by the cryptographic processing unit VE in an incrementally running process. This ensures that an attacker who disconnects the security module during operation obtains only a fraction of the partial secret KS1. The value of an overall secret does not explicitly appear in this case.

The combination with the partial secret KS2 (and optionally further partial secrets and further additional data) is then carried out in such a manner that only a k-bit of the partial secret KS1 is available in unprocessed form in the processing unit VE at a particular time. The respective sections (k-bit) of the partial secret KS1 are sufficiently small that a so-called brute force attack on the part which is respectively not available in the security module can be excluded.

The cryptographic function used should be configured such that:
1. incremental/sequential transfer of the partial secret KS1 is possible in a step n and an intermediate result, abbreviated to ZEn, is produced in the process.
2. It is not possible to reconstruct the partial secret KS1 from ZEn after step n has been completed. The basic control device and the security module can use suitable error counters to exclude the situation in which the partial secret KS1 is gradually stolen. For example, one or both partial secrets KS1 or KS2 can be definitively discarded after a predefined number of interruptions during the calculation.

One part of the cryptographic secret, that is to say the partial secret KS1, is persistently stored in the memory PS1 exclusively outside the security module in the memory of the basic control device G. Another part (partial secret KS2) is persistently stored in the memory PS2 exclusively in the security module S. The processing unit VE preferably makes it possible to serially process the partial secret KS1.

A so-called MAC (message authentication code), indicated with K, can be generated in the security module and is possibly directly output.

One embodiment provides for K to be stored in the buffer FS of the security module:
D: data
KS2: partial secret 2
KS1[$x$]: partial secret 1, bit x, wherein bit x can be referred to as a section.
H: suitable cryptographic one-way function, for example HMAC
MAC:=H(H(H(D|KS2|KS1[0])|KS1[1])|KS1[$n$]), wherein "|" expresses the serial processing of the sections 0 to n.

It is also possible to use a block cipher, for example AES in a MAC mode, to calculate a message authentication code (in particular CBC-MAC). In this case, an input block, 128 bits in the case of AES for example, is respectively determined on the basis of the currently processed bit i of the first partial secret, that is to say KS1[$i$].

If the connection to the basic control device is disconnected, K is lost in the security module and, if (temporarily) stored in FS, is lost in the buffer. The sequential processing of KS1 can be continued or reconstructed only if the security module is connected to the same basic control device again and the partial secret KS1 is again transferred to VE for calculation.

The security module can additionally contain a logic unit which detects the voltage drop when the power connection V is disconnected and additionally triggers active overwriting of the volatile buffer FS. For this purpose, the security module must include a (small) energy buffer which adequately supplies the volatile buffer FS for the erasing operation.

The plug connection between the basic device and the modular security component can be designed in such a manner that bridging of the power supply is structurally prevented/hindered upon the disconnection of the power connection V. The plug connector can mechanically prevent lateral access to the plug contacts through a wall.

The modular security component can additionally have a sensor system which detects bridging of the power supply by the basic control device and destroys the content of the volatile buffer. For this purpose, the voltage level, an internal resistance or an impedance of the power supply, for example, can be measured and checked for impermissible manipulation.

The volatile buffer in the modular security component can be regularly randomly masked (random mask can also be held in the volatile buffer). This makes it possible to prevent burn-in effects in the volatile buffer. That is to say, the memory content of the secret K cannot be stored in plain text but rather only in masked form on the basis of a changing mask which is generated in a random or pseudo-random manner (for example Kstore:=K XOR mask).

The volatility of the buffer for the partial secret KS1 (typically a few hundred bits) can be increased by means of suitable measures by using possible alternative memory types to conventional DRAM.

Memory technologies or registers or flip-flops are, for example:

a circular shift register for again avoiding burn-in effects
a delay line (delay time memory).

The processes or method sequences described above can be implemented on the basis of instructions available on computer-readable storage media or in volatile computer memories (referred to collectively as computer-readable memories below). Computer-readable memories are, for example, volatile memories such as caches, buffers or RAM and non-volatile memories such as removable data storage media, hard disks, etc.

The functions or steps described above can be present in this case in the form of at least one instruction set in/on a computer-readable memory. In this case, the functions or steps are not tied to a particular instruction set or to a particular form of instruction sets or to a particular storage medium or to a particular processor or to particular execution schemes and can be executed alone or in any desired combination by means of software, firmware, microcode, hardware, processors, integrated circuits etc. In this case, a wide variety of processing strategies can be used, for example serial processing by an individual processor or multiprocessing or multitasking or parallel processing etc.

The instructions can be stored in local memories, but it is also possible to store the instructions in a remote system and to access them via a network.

The term "processor, "central signal processing", "control unit" or "data evaluation means", as used here, comprises processing means in the broadest sense, that is to say, for example, servers, universal processors, graphics processors, digital signal processors, application-specific integrated circuits (ASICs), programmable logic circuits such as FPGAs, discrete analog or digital circuits and any desired combinations thereof, including all other processing means which are known to a person skilled in the art or will be developed in future. In this case, processors can consist of one or more apparatuses or devices or units. If a processor consists of a plurality of apparatuses, they can be designed or configured for the parallel or sequential processing or execution of instructions.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for achieving a security function for a security control device for controlling a device or an installation, comprising:
   providing a basic control device, wherein the basic control device is designed and set up in such a manner that a device which is configured to be connected or is connected to the basic control device or an installation which is configured to be connected or is connected to the basic control device is configured to be controlled or is controlled by the execution of a control program in the basic control device, and
   providing a security module which is designed and set up to provide or execute a cryptographic functionality for the basic control device,
   wherein the security module is configured to be connected or is connected to the basic control device by a data connection,
   wherein the basic control device supplies power to the security module via a power supply,
   the method further having the following steps of:
   a) providing at least one first partial secret which is stored in the basic control device;
   b) providing at least one second partial secret which is stored in the security module; and
   c) combining the at least one first partial secret and the at least one second partial secret to achieve the security function,
   wherein the at least one first partial secret is broken down into a set of sections of a predefinable size and the set of sections is gradually combined with the at least second partial secret by a calculation rule, which is configured to be processed within a predefinable period during the execution of the calculation rule according to the predefinable size and the set of sections;
   wherein the security function is no longer ensured when the power supply is interrupted between the basic control device and the security module.

2. The method as claimed in claim 1, wherein only those sections which is configured to be processed in the individual step are included in each individual step of the calculation rule.

3. The method as claimed in claim 1, wherein the combining operation is carried out within a period in which the basic control device interacts with the security module.

4. The method as claimed in claim 1, wherein an intermediate result when combining the set of sections is temporarily provided in a buffer of the security module for the purpose of processing the content held there, wherein the intermediate result is disguised after a predefinable course of time and/or at predefinable regular intervals of time.

5. The method as claimed in claim 1, wherein the content of a buffer is retained by the power supply from the basic control device.

6. The method as claimed in claim 1, wherein disconnection of a power supply and/or eavesdropping and/or manipulation is/are detected, captured and/or logged in the interaction of the basic control device with the security module and a follow-up measure is initiated.

7. The method as claimed in claim 1, wherein additional data are included in the calculation rule for the security function.

8. The method as claimed in claim 1, wherein the first partial secret is represented by a value generated from a physical unclonable function.

9. The method of claim 1, wherein an attacker who disconnects the security module from the basic control device during the gradual combining obtains only a fraction of the first partial secret and not a value of an overall secret.

10. A security control device for controlling a device or an installation, including:
    a basic control device, wherein the basic control device is designed and set up in such a manner that a device which is configured to be connected or is connected to the basic control device or an installation which is configured to be connected or is connected to the basic control device is configured to be controlled by the execution of a control program in the basic control device, and
    a security module which is designed and set up to provide or execute a cryptographic functionality for the basic control device,
    wherein the security module is configured to be connected or is connected to the basic control device by a data connection via a data interface, wherein the basic control device supplies power to the security module via a power supply,
a) wherein the basic control device is configured to provide at least one first partial secret which is stored in the basic control device;
b) wherein the security module is configured to provide at least one second partial secret which is stored in the security module; and
c) wherein the security module is configured to combine the at least one first partial secret and the at least one second partial secret in order to achieve a security function in such a manner that the at least one first partial secret is configured to be broken down into a set of sections of a predefinable size and the set of sections is configured to be gradually combined with the at least second partial secret by a calculation rule, which is configured to be processed within a predefinable period during the execution of the calculation rule according to the predefinable size and the set of sections;
wherein the security function is no longer ensured when the power supply is interrupted between the basic control device and the security module.

11. The security control device as claimed in claim 10, wherein only those sections which is configured to be processed in the individual step are included in each individual step of the calculation rule.

12. The security control device as claimed in claim 10, wherein the combining operation is configured to be carried out within a period in which the basic control device interacts with the security module by the data connection.

13. The security control device as claimed in claim 10, wherein an intermediate result when combining the set of sections is temporarily provided in a buffer of the security module for the purpose of processing the content held there, wherein the intermediate result is configured to be disguised after a predefinable course of time and/or at predefinable regular intervals of time.

14. The security control device as claimed in claim 10, wherein the content of a buffer is configured to be retained by the power supply from the basic control device.

15. The security control device as claimed in claim 10, wherein disconnection of a power supply and/or eavesdropping and/or manipulation in the interaction of the basic control device with the security module is configured to be detected, captured and/or logged and a follow-up measure is configured to be initiated.

16. The security control device of claim 10, wherein an attacker who disconnects the security module from the basic control device during the gradual combining obtains only a fraction of the first partial secret and not a value of an overall secret.

17. A computer program product, comprising a computer readable hardware storage device having computer readable program code stored therein, said program code executable by a processor of a computer system to implement a method, the method comprising:
a) receiving at least one first partial secret which is stored in a basic control device, wherein the basic control device is designed and set up in such a manner that a device which is configured to be connected or is connected to the basic control device or an installation which is configured to be connected or is connected to the basic control device is configured to be controlled or is controlled by the execution of a control program in the basic control device;
b) receiving at least one second partial secret which is stored in a security module, wherein the security module is designed and set up to provide or execute a cryptographic functionality for the basic control device, wherein the security module is configured to be connected or is connected to the basic control device by a data connection, wherein the basic control device supplies power to the security module via a power supply; and
c) combining the at least one first partial secret and the at least one second partial secret to achieve a security function, wherein the at least one first partial secret is broken down into a set of sections of a predefinable size and the set of sections is gradually combined with the at least second partial secret by a calculation rule, which is configured to be processed within a predefinable period during the execution of the calculation rule according to the predefinable size and the set of sections;
wherein the security function is no longer ensured when the power supply is interrupted between the basic control device and the security module.

18. The computer program product of claim 17, wherein an attacker who disconnects the security module from the basic control device during the gradual combining obtains only a fraction of the first partial secret and not a value of an overall secret.

* * * * *